United States Patent [19]

Komiyama et al.

[11] Patent Number: 5,093,891
[45] Date of Patent: Mar. 3, 1992

[54] BRUSHLESS MOTOR AND AN AXIAL FLOW FAN WITH THE BRUSHLESS MOTOR

[75] Inventors: Kikuo Komiyama; Ipped Hagiwara, both of Nakatsugawa, Japan

[73] Assignee: Mitsubishi Denki Kabushiki Kaisha, Tokyo, Japan

[21] Appl. No.: 588,042

[22] Filed: Sep. 25, 1990

[30] Foreign Application Priority Data

Nov. 13, 1989 [JP] Japan .................................. 1-294659
Mar. 28, 1990 [JP] Japan .................................. 2-79507

[51] Int. Cl.$^5$ ............................................ H02P 5/165
[52] U.S. Cl. .................................... 388/813; 388/934; 318/808
[58] Field of Search ............... 318/254, 138, 438–439, 318/783, 798–799, 808; 388/934, 903, 809–814

[56] References Cited

U.S. PATENT DOCUMENTS

| | | | |
|---|---|---|---|
| 4,035,692 | 7/1977 | Luy et al. | 318/375 X |
| 4,665,350 | 5/1987 | Angi et al. | 318/138 X |
| 4,667,480 | 5/1987 | Bessler | 388/811 X |
| 4,722,669 | 2/1988 | Kundert | 417/32 |
| 4,755,728 | 7/1988 | Ban | 318/254 |
| 4,883,982 | 11/1989 | Forbes et al. | 318/254 |

FOREIGN PATENT DOCUMENTS

| | | |
|---|---|---|
| 0061824 | 1/1982 | European Pat. Off. |
| 1388573 | 2/1971 | United Kingdom . |
| 1597220 | 1/1977 | United Kingdom . |
| 2006477 | 9/1978 | United Kingdom . |
| 2211289 | 6/1989 | United Kingdom . |

Primary Examiner—William M. Shoop, Jr.
Assistant Examiner—David Martin
Attorney, Agent, or Firm—Oblon, Spivak, McClelland, Maier & Neustadt

[57] ABSTRACT

A brushless motor comprises a rotor having multipolar magnets magnetized, a stator coil having a plurality of phases of winding, a rotor position detecting circuit to detect a specified position of the rotor and to output a signal having levels which alternately change in accordance with revolution of the rotor, and a phase changing circuit to output driving signals to the stator coil in accordance with the output of the rotor position detecting circuit, a stop time signal generating circuit to output a drive-stop signal for stopping the actuation of the stator coil for a predetermined time from the time when a level of the output signal of the rotor position detecting circuit is changed, a temperature detecting element to detect the temperature of an object to be cooled, an instruction value generating circuit to output to the stop time signal generating circuit an instruction signal in response to the output of the temperature detecting circuit so as to change the specified time, and an overheat detecting circuit to output an overheat alarm signal when the temperature detecting element detects a temperature exceeding the predetermined temperature.

4 Claims, 8 Drawing Sheets

BRUSHLESS MOTOR AND AN AXIAL FLOW FAN WITH THE BRUSHLESS MOTOR

BACKGROUND OF THE INVENTION

1. Field of the Invention

The present invention relates to a brushless motor and an axial flow fan with the brushless motor for cooling a machine.

2. Background Discussion

FIG. 10 is a circuit diagram showing a drive-control circuit of a conventional brushless motor disclosed in, for instance, Japanese Unexamined Patent Publication No. 37895/1984. In FIG. 10, a reference numeral 1 designates a d.c. power source, a numeral 2 designates a resister, a numeral 3 designates a rotor position detecting element such as a hall element, i.e. a hall IC or the like which is adapted to detect a specified position during the rotation of a rotor with permanent magnets (not shown), a numeral 4 designates an amplifier, numerals 5, 6 designate stator coils, numerals 7, 8 designate driving transistors connected in series to the stator coils 5, 6 respectively, a numeral 9 designates an inversion circuit, a numeral 10 designates a phase-lock operation circuit which prohibits the actuation of the stator coil of a specified phase, a numeral 11 designates a transistor which is turned on at the time of phase-lock operation to thereby turn off the driving transistor 8, and a numeral 12 designates a start compensation circuit which turns on a transistor 13 when a stopping condition of the rotor is distinguished, and which turns off the actuation of the phase-lock operation circuit 10. A character A designates a coil driving circuit constituted by the amplifier 4, driving transistors 7, 8 and the inversion circuit 9.

The operation of the conventional drive-control circuit of the brushless motor will be described.

In a normal operational state, the phase-lock operation circuit 10 is switched to be a non-operation state, and the transistor 11 is turned off. When a specified position of the rotor is detected by the rotor position detecting element 3, a detection signal is produced at the detection element 3 and is amplified by the amplifier 4. The amplified signal actuates either the driving transistor 7 or the drive transistor 8 (through the inversion circuit 9), whereby a current is alternately supplied to the stator coils 5, 6, and a torque is produced in the rotor so that the rotor is continuously rotated.

In a phase-lock operation, the phase-lock circuit 10 is changed to an operational condition, whereby the transistor 11 is actuated. The actuation of the transistor 11 turns off the transistor 8, so that a current is intermittently supplied to only the stator coil 5, and the rotor is rotated in a low speed. In this case, when current supply to the stator coil 5 is stopped and the rotor stops, no torque is produced at the restarting time in the phase-lock operation, and the starting is not obtained. In this case, however, the output of the rotor position detecting element 3 does not change unless the rotor is not rotated. When a timer installed in the start compensation circuit 12 detects that a time during which the output of the rotor position detecting element 3 does not change, exceeds a predetermined time, the transistor 13 is actuated whereby the transistor 11 is turned off. During a current supply time to the stator coil 6, the drive transistor 8 is turned on, whereby the stator coil 6 is actuated. Then, the rotor starts to rotate by a torque provided by the actuation of the coil 6 unless there is no obstacle.

When the rotor is rotated, the output of the rotor position detecting element 3 varies, whereby the start compensation circuit 12 is reset, and the transistor 13 is turned off. Thus, it is possible to carry out the above-mentioned phase-lock operation.

In the conventional brushless motor having the abovementioned construction, the revolution speed of the rotor during the phase-lock operation is determined by the phase angle at which a current is prohibited from flowing, and it is impossible to change the revolution speed. Further, in the conventional brushless motor, it is necessary to use a start compensation circuit in order to certainly re-start the motor even in a phase-lock operation. In an application of the brushless motor to an axial flow fan, it was difficult to change the revolution speed depending on the temperature of an object to be cooled. Further, it was impossible to produce a signal indicative of an abnormal state such as overheating of the object to be cooled or the axial flow fan falling into a lock condition, such signal to be supplied to the main body side of the apparatus.

SUMMARY OF THE INVENTION

It is an object of the present invention to provide a brushless motor which eliminates the need to provide a start compensation circuit: allows for consecutive change of the revolution speed depending on the temperature of an object to be cooled, and is capable of outputting an alarm signal when the object falls in to an overheating state, and an axial flow fan having such brushless motor.

In accordance with the present invention, there is provided a brushless motor comprising a rotor having multipolar magnets a stator coil having a plurality of phases of windings, a rotor position detecting circuit to detect a specified position of the rotor and to output a signal having levels which alternately change in accordance with the revolution of the rotor, and a phase changing circuit to output driving signals to the stator coil in accordance with the output of the rotor position detecting circuit, said brushless motor being characterized by comprising a stop time signal generating circuit to output a drive-stop signal for stopping the actuation of the stator coil for a predetermined time from the time when a level of the output signal of the rotor position detecting circuit is changed, a temperature detecting element to detect the temperature of an object to be cooled, an instruction value generating circuit to output, to the stop time signal generating circuit, an instruction signal in response to the output of the temperature detecting circuit so as to change the specified time, and an overheat detecting circuit to output an overheat alarm signal when the temperature detecting element detects a temperature exceeding the predetermined temperature.

In accordance with another aspect of the present invention, there is provided an axial flow fan which comprises a magnet rotor having multipolar magnets a stator having a coil wound with multi-phases, blades fixed to the rotor so as to supply an air flow to an object to be cooled, a rotor position detecting means to detect a specified position of the rotor, a coil driving circuit to change the phases and supply power to the stator coil on the basis of the output of the rotor position detecting means, a temperature detecting means to detect the temperature of the object to be cooled or the ambient temperature, a speed instruction value signal generating circuit to generate an instruction for controlling the revolution speed of a motor in accordance with the output of the temperature detecting means, and a speed control circuit which limits a time of current supply to the stator coil through the coil driving circuit in accordance with the instruction of the speed instruction signal value generating circuit.

DETAILED DESCRIPTION OF THE PREFERRED EMBODIMENTS

Preferred embodiments of the present invention will be described with reference to the drawings.

Figure 10:
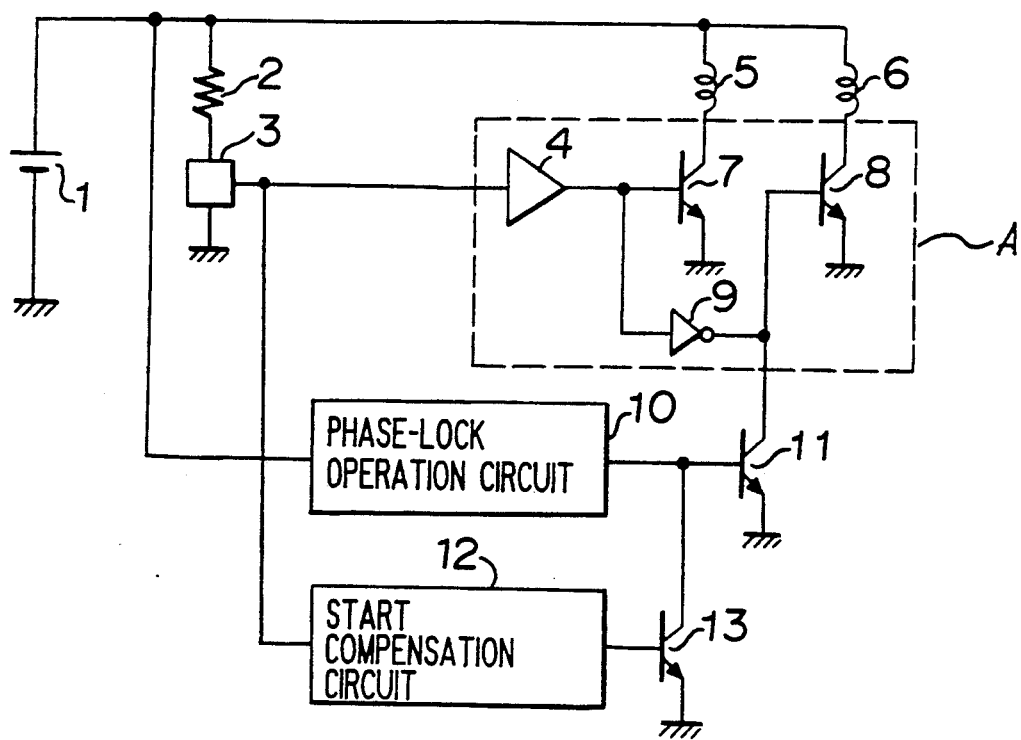
FIG. 10 is a circuit diagram of the drive-control circuit of a conventional brushless motor.

In FIGS. 1 through 4, numerals 1 through 8 designate the same elements as shown in FIG. 10, and accordingly the description of these parts is omitted.

A numeral 14 designates an axial flow fan and control circuit, a numeral 15 designates a rotor having multipolar magnets a numeral 16 designates blades of the fan, and numeral 17 designates a phase changing circuit which consecutively outputs the driving signals of the stator coils 5, 6 to the drive transistors 7, 8 in accordance with the output of a rotor position detecting circuit which comprises the rotor position detecting element 3 and the amplifier 4. Numeral 18 designates a stop time signal generating circuit which outputs a drive-stop signal for stopping the actuation of the stator coil by the phase changing circuit 17 for a predetermined time from the time when a level of the output signal of the amplifier 4 changes. Numeral 19 designates a temperature detecting element to detect the temperature of an object to be cooled, and numeral 20 designates an instruction value generating circuit which outputs an instruction signal indicating a value corresponding to the output of the temperature detecting element 19 to the stop time signal generating circuit 18 so as to change a time period during which the actuation of the stator coil is prevented. Numeral 21 designates an overheat detecting circuit which outputs an overheat alarm signal when the temperature detecting element 19 detects that the temperature of the object to be cooled is higher than a predetermined value. Numeral 22 designates an overheat alarming transistor which is turned on by the signal of the overheat detecting circuit 21, and numeral 23 designates a lock condition detecting circuit which detects that a level in an output signal from the amplifier 4 is maintained for a predetermined time to thereby output a drive-stop signal for stopping the actuation of the stator coil by the phase switching circuit 17 for a second predetermined time. Numeral 24 designates a lock condition alarming transistor which is turned on by a drive-stop signal from the lock condition detecting circuit 23, and a numeral 25 designates an alarm outputting terminal which is changed to an L-level when either of the alarming transistors 22, 24 is turned on and outputs an alarm signal to an external alarm device (not shown).

The operation of the above-mentioned embodiment will be described. During the rotation of the rotor 15, the output of the rotor position detecting element 3 changes, and the output of the amplifier 4 alternately changes between a high level and a low level. Either transistor 7 or the transistor 8 is actuated by the phase changing circuit 17, and accordingly, the stator coils 5, 6 are alternately supplied with a current, whereby the revolution of the rotor is continued. In this case, when a change in output level of the signal of the amplifier 4 is detected by the stop time signal generating circuit 18, it outputs to the phase changing circuit 17 a drive-stop signal to stop the actuation of the phase changing circuit 17 for a predetermined time $T_0$. During the time $T_0$, both the transistors 7, 8 are turned off, and a current to the stator coils 5, 6 is stopped as shown by the solid line in FIG. 2. Accordingly the revolution speed of the rotor 15 is reduced. When the time $T_0$ is 0, i.e. there is no drive-stop signal, the rotor 15 is rotated at the full speed as shown by dotted lines in FIG. 2. Since $T_0$ has a limited value and the coils having different phases are supplied with a current, the starting of the rotor can be certainly obtained.

Figure 1:
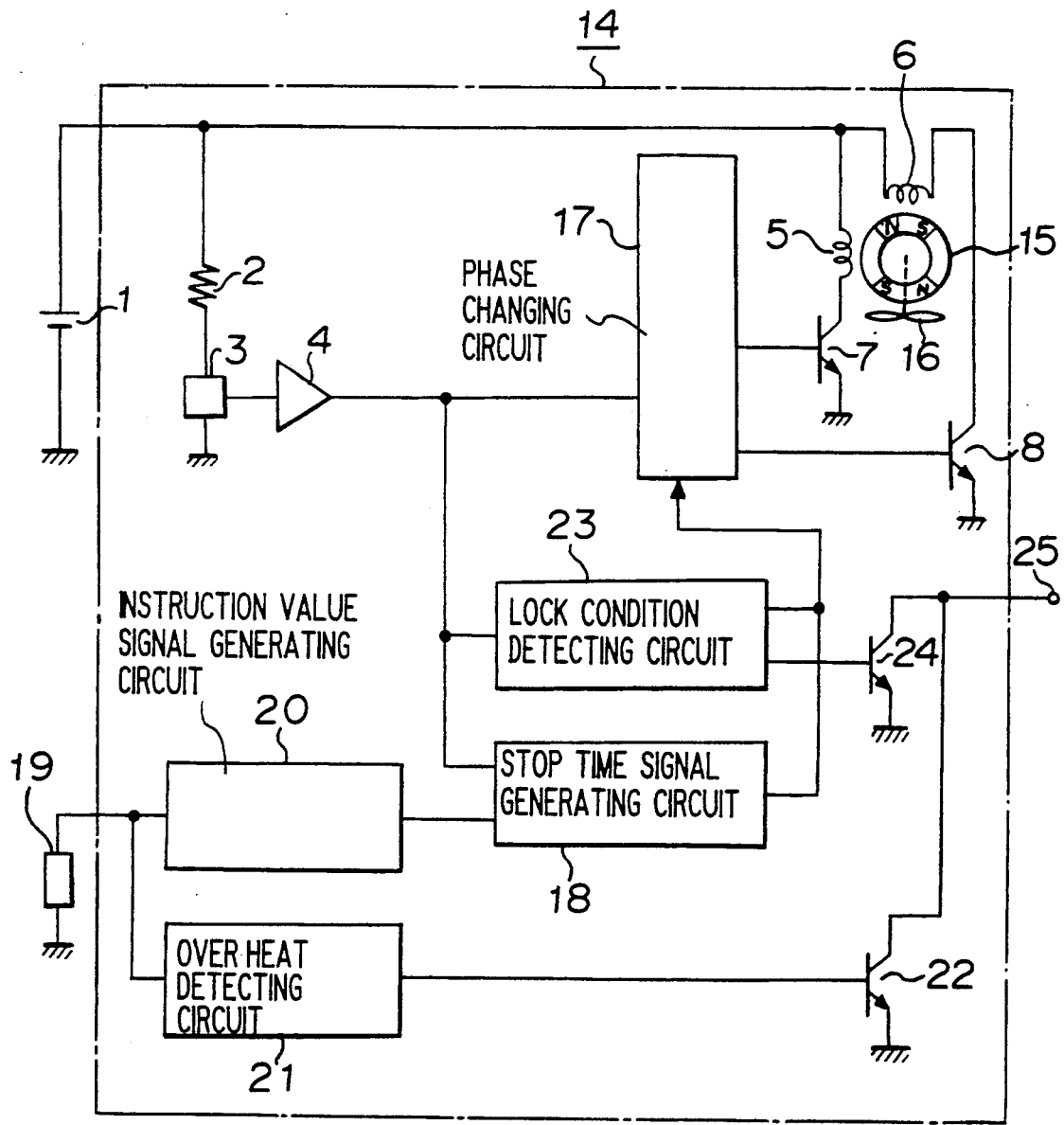
FIG. 1 is a circuit diagram showing an embodiment of the control circuit for a brushless motor according to the present invention.
Figure 2:
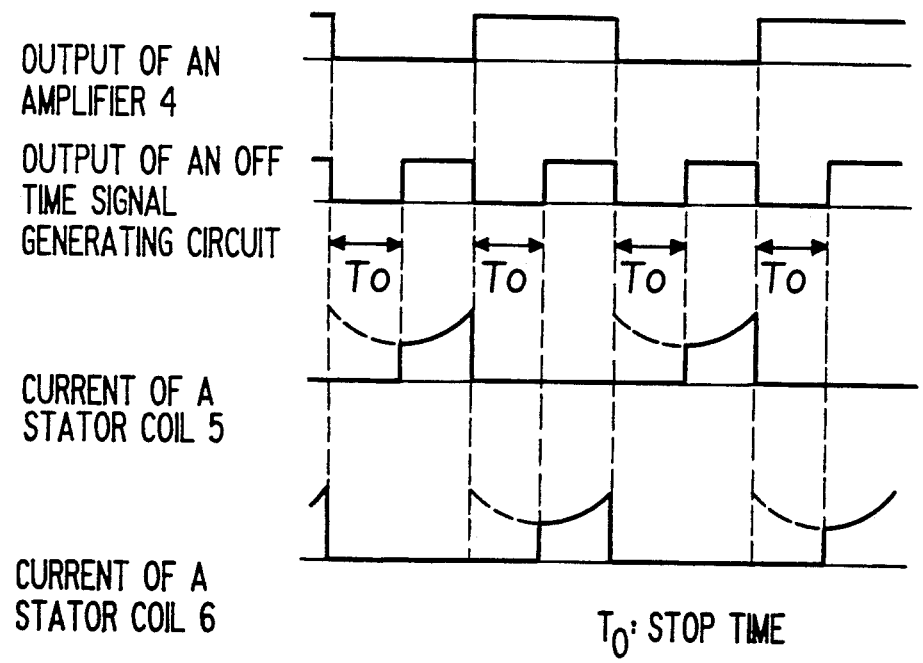
FIG. 2 is a time chart showing the waveform of signals generated from the major elements.
Figure 3:
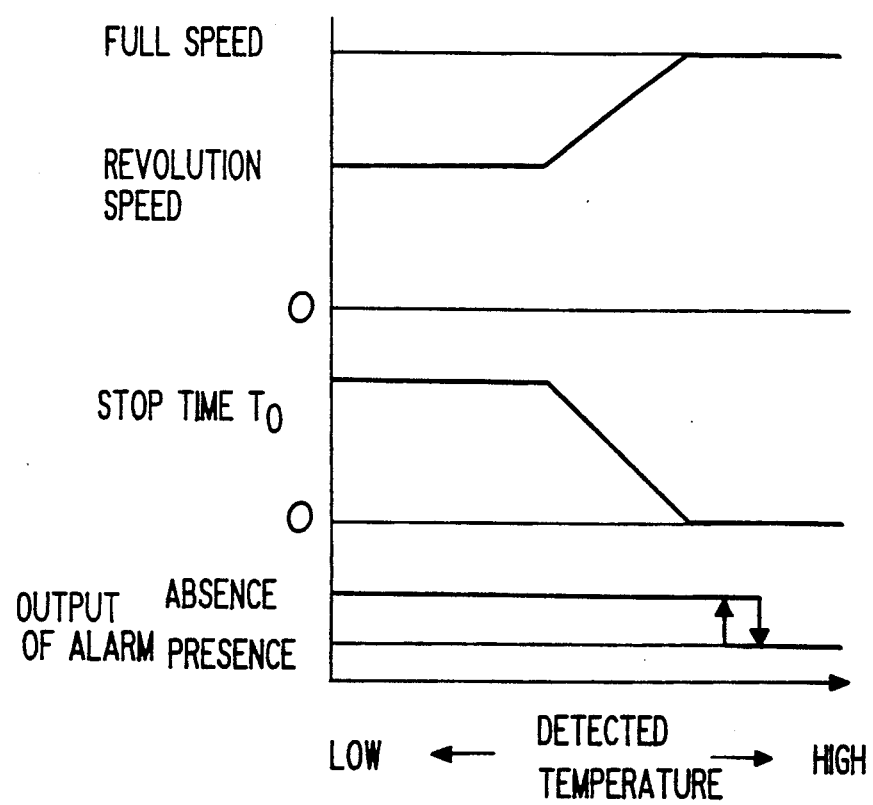
FIG. 3 is a diagram of temperature characteristics.

When the temperature of an object to be cooled by the axial flow fan 14 changes, the output of the temperature detecting element 19 also changes. Accordingly, an instruction value which changes the time $T_0$ as shown in FIG. 3 is outputted from the instruction value generating circuit 20 to the stop time signal generating circuit 18 in correspondence to a amount of change in the output of the temperature detecting element 19. Thus, the revolution speed of the rotor 15 is changed as shown in FIG. 3. Namely, when a temperature detected is lower than a predetermined value, the time $T_0$ for stopping the actuation of the stator coils and the revolution speed are maintained constant. On the other hand, when the temperature detected exceeds the predetermined value, the revolution speed changes consecutively between a low speed and the full speed. When the temperature detected becomes high or low, the revolution speed assumes a fixed high speed or a fixed low speed. Further, when the temperature of an object to be cooled exceeds a predetermined temperature, the overheat detecting circuit 21 detects it and outputs a signal to turn on the overheat alarming transistor 22. Then, the alarm output terminal 25 changes to an L-level so that an alarm signal is outputted to an external alarm device (not shown). The temperature characteristic as shown in FIG. 3 is only an example. For example, it is possible that the revolution speed gradually decreases as the temperature decreases.

It is considered that an overheat alarm signal is produced in the following situations.

(1) A necessary amount of air can not be obtained and an object to be cooled becomes overheating because the axial flow fan rotates at the full speed while the filter is clogged, or the axial flow fan is not operated at the full speed by any cause.

(2) While the axial flow fan is rotated at the full speed, a power transistor becomes overheating due to a fault in an electronic circuit including the power transistor.

Figure 4:
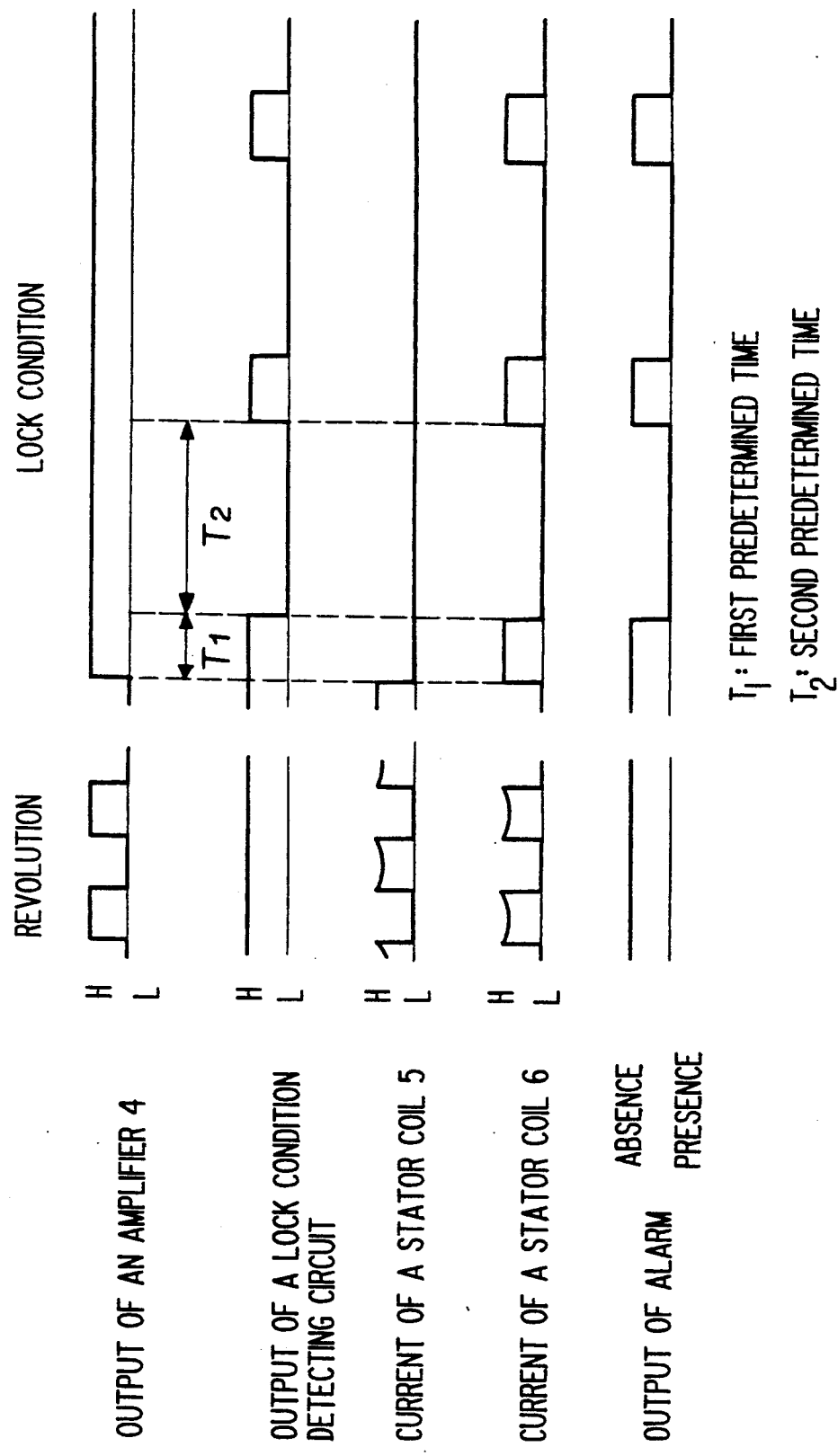
FIG. 4 is a time change showing the waveform of signals produced from the major elements in normal and abnormal states.

In the following, description will be made as to a case that the motor falls in a lock condition. When the rotation of the rotor 15 is stopped under the condition that the motor is in a lock condition, the output of the amplifier 4 does not change. When such state is maintained for a first predetermined time $T_1$, the output of the lock detecting circuit 23 is inversed as shown in FIG. 4, and a drive-stop signal for stopping the actuation of the stator coils is outputted to the phase changing circuit 17 for a second predetermined time $T_2$, whereby both the driving transistors 7, 8 are turned off during a period of time $T_2$. After the second predetermined time $T_2$ has passed, the drive-stop signal from the lock detecting circuit 23 disappears and only one of the driving transistors 7, 8 is turned on through a signal from the phase changing circuit 17. As a result, one of the stator coil 5 or the stator coil 6 is fed with a current. If the motor is still in the lock condition and the rotor 15 remains in a stopping state, a drive-stop signal is again outputted from the lock detecting circuit 23 after the first predetermined time $T_1$. Thus, the above-mentioned operations are repeated until the lock condition is released. During the second predetermined time $T_2$, in which the drive-stop signals are outputted, the lock alarming transistor 24 becomes an ON state, and the alarm output terminal 25 becomes an L-level, whereby an alarm signal is outputted to the alarm device.

The above-mentioned embodiment is so constructed that the temperature detecting element detects the temperature of an object to be cooled which is a separate body and is cooled by the axial flow fan. However, the temperature detecting element may be installed in the axial flow fan to detect the temperature of an electronic circuit element cooled itself.

Thus, in accordance with the above-mentioned embodiment of the brushless motor according to the present invention, it is unnecessary to provide a start compensation circuit; the revolution speed of the rotor can be changed in accordance with a detected temperature of an object to be cooled; and an alarm is generated when the object to be cooled falls in an overheat state; thus, a reliable brushless motor can be obtained.

Further, the brushless motor of the present invention has a lock condition detecting circuit which detects that a level in an output signal from the rotor position detecting circuit is maintained for a first predetermined time and outputs a drive-stop signal to stop the stator coils for a second predetermined time, and an alarm output terminal through which either signal from the lock condition detecting circuit or the overheat detecting circuit is supplied to an alarm circuit. Accordingly, a lock condition can be certainly detected and an alarm signal is produced. Further, a normal operation is automatically obtainable when the stop condition is eliminated.

Further, in case that the above-mentioned brushless moter is installed together with a control circuit in an axial flow fan, there is obtainable an axial flow fan highly appreciated in performance and reliability.

Preferred embodiments of an axial flow fan with the above-mentioned brushless motor, which is used for cooling a machine, will be described.

Figure 5:
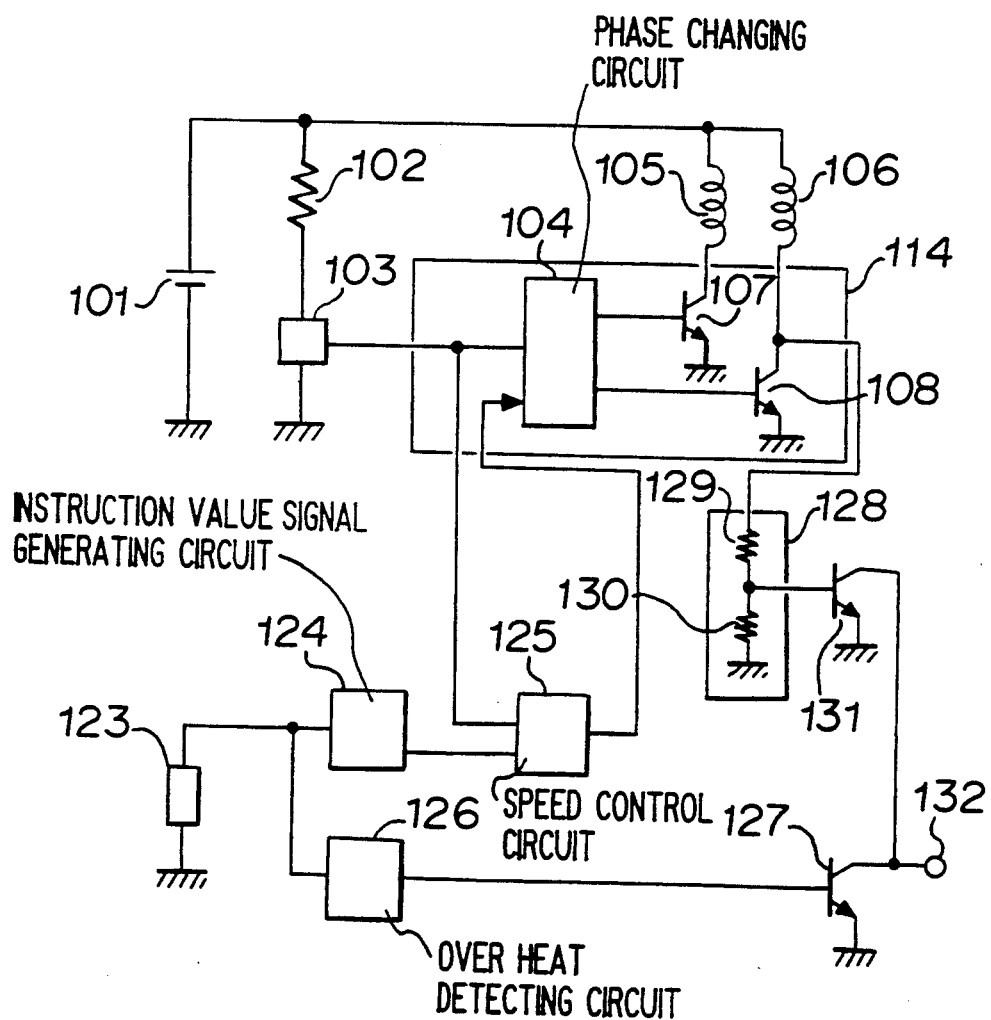
FIG. 5 is a circuit diagram of the motor driving section of the axial flow fan according to the present invention.

FIG. 5 is a circuit diagram of a motor driving section of the axial flow fan according to the present invention. In FIG. 5, a reference numeral 101 designates a d.c. power source, a numeral 102 designates an adjusting resistor, a numeral 103 designates a rotor position detecting means such as a hall element, and numeral 104 designates a phase changing circuit to switch a current so that it flows into a stator coil 105 or a stator coil 106, in accordance with output signals from the rotor position detecting means 103, 107, 108 designate transistors which are turned on and off through signals from the phase changing circuit 104, and a numeral 114 designates coil driving circuit constituted by the phase changing circuit 104 and the transistors 107, 108. A numeral 123 designates a temperature detecting means to detect the temperature of an object to be cooled or the ambient temperature, numeral 124 designates an instruction value signal generating circuit which determines the revolution speed of the motor on the basis of the temperature detected by the temperature detecting means 103 and outputs a signal indicating a determined revolution speed, and numeral 125 designates a speed control circuit including a timer which determines an OFF time which is changed by an instruction from the instruction value signal generating circuit 124, the speed control circuit controlling the revolution speed of the motor by limiting a current conduction time to the stator coils 105, 106 by turning off a part of a driving time by the OFF time determined by the generating circuit 124. Numeral 126 designates an overheat detecting circuit to detect an abnormally high temperature in the object to be cooled, a numeral 127 designates a transistor which is turned on by the output of the overheat detecting circuit 126, and numeral 128 designates a revolution pulse signal generating circuit to generate a revolution pulse signal which corresponds to a time of the actuation of the stator coil 106. Numerals 129, 130 designate resistors to divide the voltage of the revolution pulse signal generating circuit 128, a numeral 131 designates a transistor to output a revolution pulse signal and a numeral 132 designates an alarm output terminal which outputs either the revolution pulse signal or the overheat detection signal.

Figure 6:
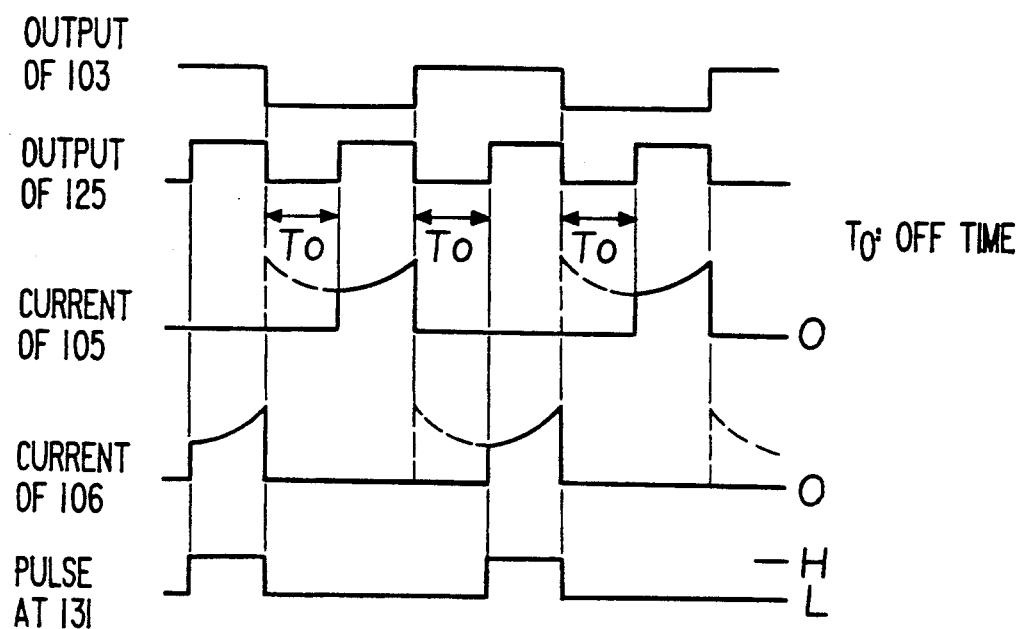
FIG. 6 is a time chart of signals generated in the motor drive section.
Figure 7:
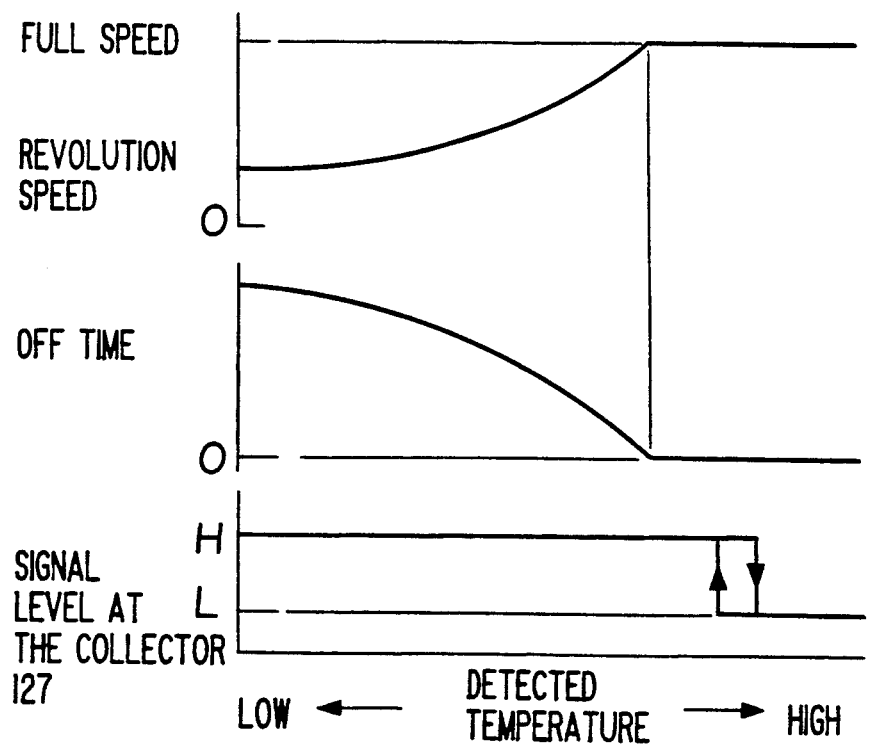
FIG. 7 is a diagram showing the revolution speed of the motor and temperature characteristic of overheat alarm.

FIG. 6 is a time chart of the motor driving circuit wherein $T_0$ indicates an OFF time which limits a current conduction time to the stator coils 105, 106, which is determined by the speed control circuit 125. FIG. 7 is a diagram showing a relation of temperature to the revolution speed and the generation of an overheat alarm signal.

The operation of the above-mentioned embodiment of the present invention will be described.

The rotor position detecting means 103 detects a specified position of the rotor and outputs a position signal. The phase changing circuit 104 receives the signal and outputs a signal by which either of the transistors 107, 108 is actuated alternately, whereby the stator coils 105, 106 are supplied with a current alternately. Thus, the rotor is continuously rotated. The temperature detecting means 123 detects the temperature of the object to be cooled or the ambient temperature. The instruction value signal generating circuit 124 receives the signal of the temperature detecting means 123 and outputs a speed instruction value signal corresponding to the temperature detected. The speed control circuit 125 calculates an OFF time having a time width corresponding to the instruction and outputs a signal to the phase changing circuit 104 so that a current conduction time to the stator coils 105, 106 is limited by the OFF time. The longer the OFF is, the shorter the electric conduction time is, i.e. the revolution speed is low.

FIG. 6 is a diagram showing the waveform of signals generated from the major elements of the axial flow fan. An OFF time $T_0$ is produced at the beginning of each driving time. However, it is not always so. Since the OFF time is determined by a timer, the OFF time ends without any relation to an angle of revolution, and accordingly, it is unnecessary to provide a start compensation circuit.

FIG. 7 shows the temperature characteristic of the axial flow fan of the present invention. As shown in FIG. 7, the revolution speed becomes low by increasing the OFF time $T_0$ when the temperature of an object to be cooled is low. At a certain temperature or higher, the OFF time $T_0$ is made 0, whereby the motor of the actual flow fan is rotated at the full speed. However, the OFF time $T_0$ may be fixed at a temperature which is different from the above-mentioned temperature or lower so that the revolution number of the motor is made constant.

The revolution pulse signal generating circuit 128 detects a voltage at the junction between the stator coil 106 and the transistor 108 to thereby output a revolution pulse signal having the pulse number in proportion to the number of revolutions, whereby the transistor 131 is actuated in an open collector condition to thereby output the revolution pulse signal to the alarm output terminal 132.

In a non-current conduction state on the stator coil 106, the collector voltage of the transistor 108 is high (H). The revolution pulse signal generating circuit 108 divides the voltage by the resistors 129, 130 and turns on the transistor 131. On the other hand, in a current conduction state on the stator coil 106, the collector voltage of the transistor 108 is substantially zero and is in an L-level, whereby the transistor 131 is turned off.

In the above-mentioned embodiment, the collector voltage of the transistor 108 is used as an input to the revolution pulse signal generating circuit 28. However, an input signal to the phase changing circuit 104 or the output signal of it may be used.

Since the overheat detecting circuit 126 turns off the transistor 127 when a temperature detected by the temperature detecting means 123 is low, the revolution pulse signal is outputted to the alarm output terminal 132. When a temperature detected exceeds a predetermined value, the transistor 128 is turned on and the alarm output terminal 132 is maintained at an L-level, so that a signal of abnormality is transmitted to the outside.

An overheat alarm signal will be generated in the following three cases.

(1) A sufficient amount of air can not be obtained and accordingly, the temperature of an object to be cooled and the ambient temperature become high because the filter is clogged while the fan is rotated at the full speed, or the fan can not be rotated at the full speed.

(2) A power transistor is overheated due to a fault in an electronic circuit including the power transistor while the fan is rotated at the full speed to supply a sufficient amount of air.

(3) The ambient temperature is too high.

A pulse signal in which an H-level and an L-level alternately change is outputted through the alarm output terminal 132 so that the revolution speed can be monitored in the normal operations. If the output of the revolution pulse signal is fixed to an H-level, there is a phenomenon that the rotor is locked, i.e. a lock alarm condition. If the output signal is fixed to an L-level, there is a lock alarm condition, or an overheat alarm condition wherein the overheat detecting circuit 126 detects an abnormal state. Namely, discrimination of lock alarming, overheat alarming and revolution pulse can be obtained through the alarm output terminal 132 and a single line including the transistors 127, 131.

Figure 8:
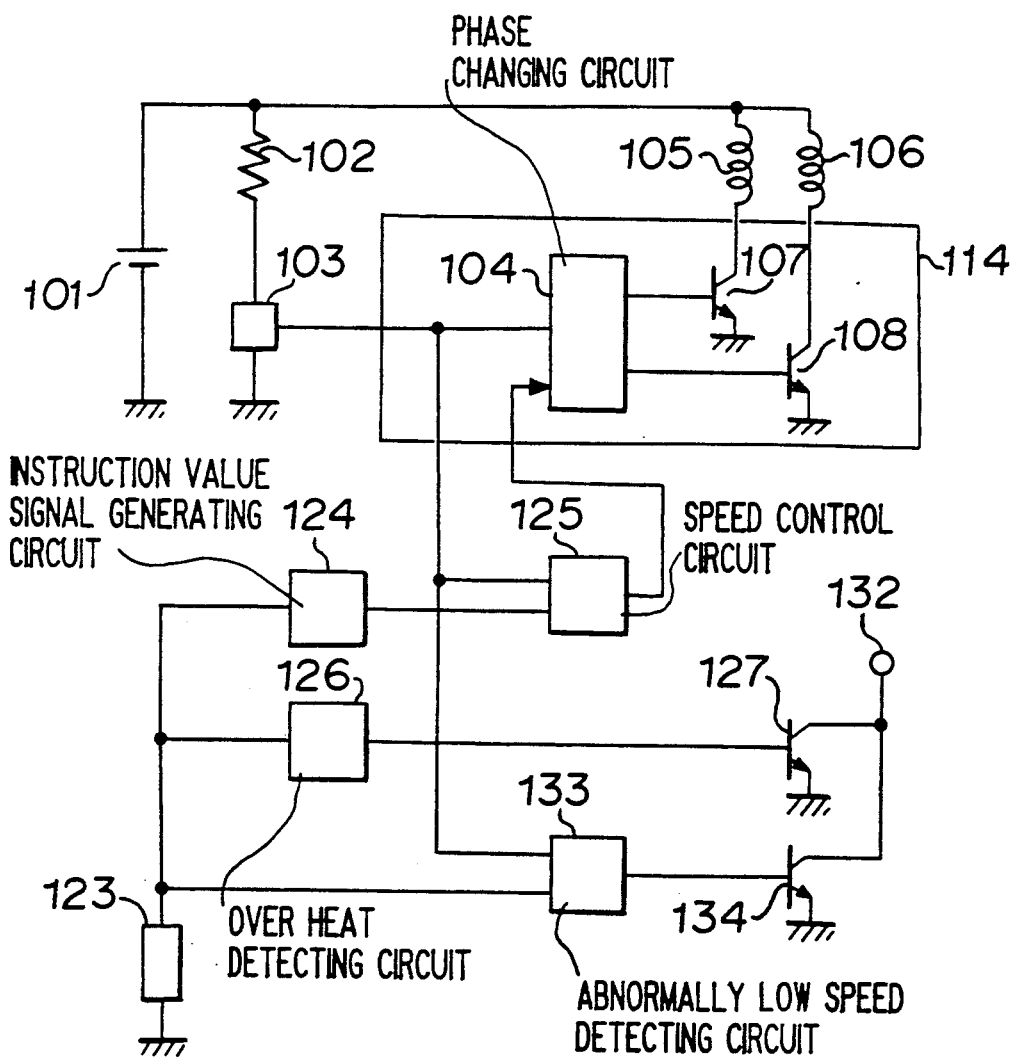
FIG. 8 is a circuit diagram showing another embodiment of the motor driving section of the axial flow fan according to the present invention.

Another embodiment of the motor driving circuit of the axial flow fan of the present invention will be described with reference to FIG. 8. The construction of this embodiment is the same as that of FIG. 5 except that an abnormally low speed detecting circuit 133 and a transistor 134 are used instead of the revolution pulse signal generating circuit 128 and the transistor 131.

The abnormally low speed detecting circuit 133 is to detect the revolution speed of the motor which does not reach a necessary value of speed. The detection is conducted on the basis of the temperature of the object to be cooled which is detected by the temperature detecting means 123.

Figure 9:
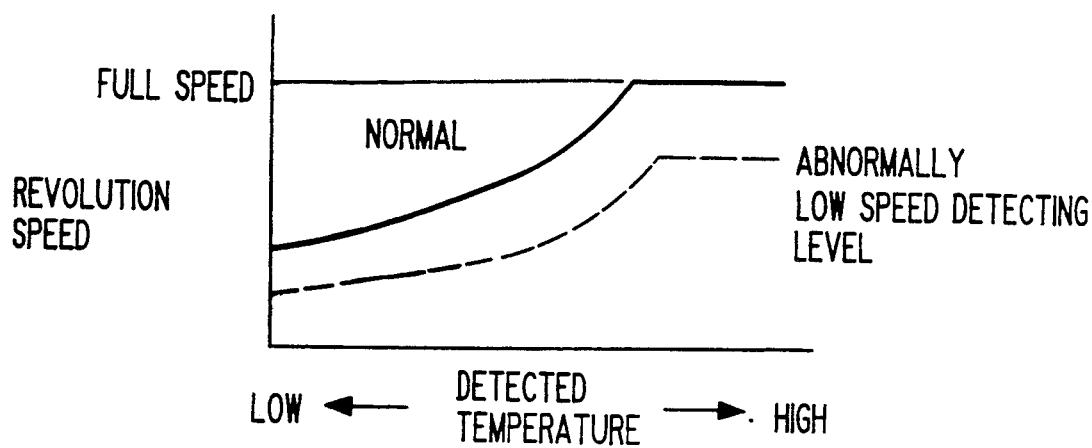
FIG. 9 is a diagram of temperature characteristics in the embodiment as shown FIG. 8.

FIG. 9 shows a relation of the temperature detected to the revolution speed.

The transistor 134 is turned on when the abnormally low speed detecting circuit 133 detects an abnormally low speed and outputs an alarm signal indicating that the revolution speed is abnormally low. Since the alarm output terminal 132 is connected in parallel to the collectors of the transistors 127, 134, signals of overheat alarm and abnormally low speed alarm can be outputted to the external alarm device.

When the motor is started, the revolution speed is 0. Accordingly, the abnormally low speed detecting circuit 133 is provided with a function to prohibit the detection of abnormally low speed by a predetermined time so as not to generate an alarm.

Thus, in accordance with the above-mentioned embodiment of the axial flow fan of the present invention, the revolution speed at a low speed lesion can be successively changed without providing a start compensation circuit.

We claim:

1. A brushless motor and control comprising a rotor having multipolar magnets magnetized, a stator coil having a plurality of phases of winding, a rotor position detecting circuit to detect a specified rotational position of the rotor and to output an output signal at an output thereof which changes at a specified rotational position of the rotor, and a phase changing circuit to output driving signals to the stator coil in accordance with the output of the rotor position detecting circuit, said brushless motor and control circuit being characterized by comprising:

a stop time signal generating circuit to output a drive-stop signal for stopping the actuation of the stator coil for a predetermined time from the time when the output signal of the rotor position detecting circuit changes, a temperature detecting element to detect the temperature of an object to be cooled, an instruction value generating circuit to output to the stop time signal generating circuit an instruction signal in response to the output of the temperature detecting circuit so as to change the specified time, and an overheat detecting circuit to output an overheat alarm signal when the temperature detecting element detects a temperature exceeding the predetermined temperature.

2. The brushless motor according to claim 1, which further comprises a lock condition detecting circuit which detects that a level in an output signal from the rotor position detecting circuit is maintained for a predetermined time or longer and which outputs a signal to stop the actuation of the stator coil for a second predetermined time, and an alarm output terminal through which either signal from the lock condition detecting circuit or the overheat detecting circuit is supplied to an alarm circuit.

3. An axial flow fan and control circuit which comprises:

a magnet rotor having multipolar magnets magnetized, a stator having a coil wound with multi-phases, blades fixed to the rotor so as to supply an air flow to an object to be cooled, a rotor position detecting means to detect a specified position of the rotor, a coil driving circuit to change the phases and supply power to the stator coil on the basis of an output of the rotor position detecting means, a temperature detecting means to detect the temperature of an object to be cooled, a speed instruction value signal generating circuit to generate an instruction on the revolution speed of a motor in accordance with the output of the temperature detecting means, a speed control circuit which limits a time of current supply to the stator coil through the coil driving circuit in accordance with the instruction of the speed instruction signal value generating circuit;

a revolution pulse signal generating circuit to output a revolution pulse signal having a number of pulses in proportion to the number of revolutions of the rotor and an overheat detecting circuit to output a signal when a detected temperature of the object exceeds a predetermined level;

wherein the revolution pulse signal generating circuit and the overheat detecting circuit are connected to a single output line by switching means.

4. An axial flow fan and control circuit which comprises:

a magnet rotor having multipolar magnets magnetized, a stator having a coil wound with multi-phases, blades fixed to the rotor so as to supply an air flow to an object to be cooled, a rotor position detecting means to detect a specified position of the rotor, a coil driving circuit to change the phases and supply power to the stator coil on the basis of an output of the rotor position detecting means, a temperature detecting means to detect the temperature of an object to be cooled, a speed instruction value signal generating circuit to generate an instruction on the revolution speed of a motor in accordance with the output of the temperature detecting means, a speed control circuit which limits a time of current supply to the stator coil through the coil driving circuit in accordance with the instruction of the speed instruction signal value generating circuit;

an abnormal low speed detecting circuit to generate an output signal indicative of an abnormally low speed when the revolution speed of the rotor is lower than a predetermined value, and an overheat detecting circuit to output a signal when a detected temperature of the object exceeds a predetermined level, wherein the abnormal low speed detecting circuit and the overheat detecting circuit are both connected to a single output line, respectively by switching means, the output line outputting either a signal of the abnormally low detecting circuit or the overheat detecting circuit.

* * * * *

UNITED STATES PATENT AND TRADEMARK OFFICE
CERTIFICATE OF CORRECTION

PATENT NO. : 5,093,891
DATED : March 3, 1992
INVENTOR(S) : Kikuo Komiyama et al.

It is certified that error appears in the above-identified patent and that said Letters Patent is hereby corrected as shown below:

On the Title page, item [75], the second inventor's name should be

--Ippei Hagiwara--.

Signed and Sealed this

Eighth Day of June, 1993

Attest:

MICHAEL K. KIRK

Attesting Officer     Acting Commissioner of Patents and Trademarks